United States Patent
Campbell et al.

(10) Patent No.: US 8,311,905 B1
(45) Date of Patent: Nov. 13, 2012

(54) COMPUTERIZED SYSTEM AND METHOD FOR AUTOMATED DEMAND-BASED PARTS DELIVERY

(75) Inventors: John Campbell, East Liberty, OH (US); Hiroshi Kawaguchi, Indianapolis, IN (US); Joseph Lewis, Indianapolis, IN (US); Masahiko Minamikawa, Columbus, IN (US); Steven Swank, Lawrenceburg, IN (US); Toshihide Tanaka, Indianapolis, IN (US)

(73) Assignees: Honda Motor Co., Ltd., Tokyo (JP); Midwest Express Inc., East Liberty, OH (US)

( * ) Notice: Subject to any disclaimer, the term of this patent is extended or adjusted under 35 U.S.C. 154(b) by 387 days.

(21) Appl. No.: 12/569,580

(22) Filed: Sep. 29, 2009

Related U.S. Application Data (63) Continuation-in-part of application No. 12/240,852, filed on Sep. 29, 2008, now Pat. No. 8,010,220.

(60) Provisional application No. 61/101,102, filed on Sep. 29, 2008.

(51) Int. Cl.
*G06Q 10/00* (2006.01)
(52) U.S. Cl. .......... 705/28; 705/7; 705/26; 705/14; 705/15; 705/22; 705/29; 705/13; 705/37; 700/96; 700/97; 700/99; 700/100; 700/106; 700/101; 700/95; 700/115; 235/382; 235/383; 235/385; 235/376
(58) Field of Classification Search .......... 705/28
See application file for complete search history.

(56) References Cited

U.S. PATENT DOCUMENTS

| | | | |
|---|---|---|---|
| 4,683,540 A | 7/1987 | Kurosu et al. | |
| 5,528,489 A | 6/1996 | Asahara et al. | |
| 6,141,598 A | 10/2000 | Nam | |
| 6,698,655 B2 | 3/2004 | Kondo et al. | |
| 6,705,523 B1 | 3/2004 | Stamm et al. | |
| 6,813,539 B2 | 11/2004 | Morimoto et al. | |
| 6,993,421 B2 * | 1/2006 | Pillar et al. | 701/29.4 |
| 7,010,373 B2 | 3/2006 | Fukushima et al. | |
| 2004/0153379 A1 * | 8/2004 | Joyce et al. | 705/28 |
| 2006/0074778 A1 | 4/2006 | Katou et al. | |
| 2007/0187183 A1 * | 8/2007 | Saigh et al. | 186/53 |
| 2007/0228142 A1 | 10/2007 | Yamaguchi | |
| 2009/0082902 A1 * | 3/2009 | Foltz et al. | 700/214 |

OTHER PUBLICATIONS

Caputo, Antonio C Pelagagge, Pacifico M. Management criteria of automated order picking systems in high-rotation high-volume distribution centers. Industrial Management + Data Systems, v106n9, p. 1359-1383.*

* cited by examiner

*Primary Examiner* — F. Zeender
*Assistant Examiner* — Fawaad Haider
(74) *Attorney, Agent, or Firm* — Standley Law Group LLP (57) ABSTRACT

A computerized automated demand-based parts delivery management system and method is disclosed. Parts for use in a production facility are received at a warehouse and housed in storage inventory areas such as trailers parked in a yard. Data about the parts in storage inventory areas and their locations as well as an inventory of parts in the warehouse are stored in a database. A "demand pegging" operation is performed by viewing current delivery inventory levels within the warehouse and applying them to production demand data to determine when parts will be depleted from delivery inventory areas. The operation further identifies storage inventory areas that have the needed parts. Process times for transporting parts between locations are considered in determining task times for transporting parts from storage inventory areas to delivery inventory areas so parts are replenished in advance of the deplete time determined by the demand pegging operation.

20 Claims, 10 Drawing Sheets

COMPUTERIZED SYSTEM AND METHOD FOR AUTOMATED DEMAND-BASED PARTS DELIVERY

CROSS-REFERENCE TO RELATED APPLICATIONS

This application is a continuation-in-part of U.S. patent application Ser. No. 12/240,852, filed Sep. 29, 2008, and titled SYNCHRONOUS AND OPTIMUM LINE DELIVERY UTILIZING TACT INFORMATION, which is incorporated herein by reference. This application claims priority to U.S. Provisional Patent Application No. 61/101,102, filed Sep. 29, 2008, titled LOGISTICS PROVIDER PARTS DELIVERY AND MANAGEMENT SYSTEM, which is incorporated herein by reference.

FIELD OF THE INVENTION

The present invention relates to parts delivery management for assembly plants. More particularly, a computerized system and method is disclosed for automated demand-based parts delivery in which parts are pulled from an inventory holding area according to a production demand schedule.

BACKGROUND OF THE INVENTION

To keep production lines moving, manufacturers require delivery of the right part to the right place at the right time and in the right quantity. In conventional production lines such as automotive assembly lines, parts are added or assembled to a partially assembled product as it passes by assembly stations or areas on the production line. Associates working on the production line install parts and complete assembly processes as may be required to build a product meeting a particular set of specifications. A production schedule usually determines which manufacturer products will be built on a particular day or other production period and therefore, dictates which parts or components are needed on the production line so associates can complete the installation and assembly tasks at the assembly stations or areas. If an associate at an assembly station does not have the right parts at the right time, accommodations to the production process must be made. The product may be held or diverted to another location while attempts are made to locate the appropriate parts. Production slows or worse, may be halted entirely, as time is spent locating the appropriate part or parts to complete the necessary installation and assembly tasks.

To facilitate delivery of parts to the production line, some manufacturers work with a logistics provider that manages inventories of parts at the manufacturing facility and uses a variety of delivery techniques transport parts from various inventory locations to production line locations when a need for replenishment is determined. For example, when the line side supply of a particular part at a particular location drops below a threshold, a replenishment method may be used in which an associate drives a vehicle loaded with the low inventory part to the particular production line location. Other manufacturers respond to replenishment requests using automated guided vehicles that deliver parts to assembly line locations based on directional information programmed into the vehicles.

Various right part, right place, right time (RPT) production methods have been developed to reduce costs attributable to maintaining replenishment inventories. RPT techniques involve coordinating the delivery of parts to the manufacturer's assembly plant as well as to "line side" locations in an effort to reduce inventory levels and, consequently, costs. Some manufacturers have incorporated parts consolidation centers into their RPT practices. Consolidation centers are facilities where parts are received from suppliers, staged for use in one or more assembly plants (i.e., organized according to the order in which they will be consumed), and then transported from the consolidation center to an assembly plant production line where they are consumed. In an effort to control costs, suppliers may be asked to deliver parts to the consolidation center in conjunction with the manufacturer's production schedule and to provide parts in full truck loads rather than partial truck loads.

Although delivering parts in full truck loads is more cost-effective than delivering them in partial truck loads, it also impacts consolidation center or warehouse logistics. More time and effort is required to unload a full loaded trailer than a partially loaded trailer. In addition, the consolidation center or warehouse must be able to at least temporarily store and track the parts that are unloaded but are not ready to be delivered line side. While a manufacturer may arrange to have parts delivered from suppliers to the consolidation center or warehouse according to specific production needs, the arrival of the trucks that deliver the trailers of parts may not necessarily coincide with the manufacturer's schedule. If a substantial number of trailers are used to supply parts for production, the logistics provider that operates the consolidation center or warehouse must have procedures in place for receiving the trailers and determining how and when they will be unloaded.

Ideally, the unloading of trailers corresponds to the manufacturer's production needs and therefore, the need for parts. Determining which trailers are needed and when, however, requires an analysis of production requirements and inventory as well as knowledge about the parts inventory that is available on the trailers at the consolidation center. Information needed for such an analysis is often stored in different computerized systems and the applications executing at the computerized systems do not support such an analysis. What is needed is an application that provides an integrated view of the data and that analyzes the data to determine a schedule for unloading parts from trailers. There is a need for a computerized system and method for parts delivery that aligns the process of unloading trailers with a manufacturer's production needs. There is also a need for a computerized system and method for parts delivery that defines a schedule for unloading trailers consistent with a manufacturer's production needs. There is a need for a computerized system and method for parts delivery that accounts for a manufacturer's demand for parts throughout a production period. There is a need for a computerized parts delivery management system and method that correlates the unloading of trailers with a production schedule to further the goal of delivering the right part to the right production line location at the right time.

SUMMARY OF THE INVENTION

A computerized demand-based parts delivery management system and method furthers a logistics provider's goal of delivering the right part to the right production line location at the right time. In an example embodiment, a consolidation center for receiving parts from suppliers is co-located with an assembly plant. Parts are received in trailers that are parked in a yard at the consolidation center. Data about the parts on each trailer and each trailer's location in the yard is stored in a database. Other databases that are used in the computerized system and method store inventory data regarding parts available at the consolidation center as well as production demand data identifying the parts that are needed for production. The computerized system and method analyzes the inventory and production demand data to determine when parts from the trailers are needed to meet production demand. The trailers or other storage inventory areas that have the required parts are identified and a schedule for transporting parts from storage inventory areas (e.g., trailers) with the required parts is generated. The computerized system and method generates a receiving schedule that comprises a series of tasks for transporting trailers from the yard (or other storage inventory areas) to docks at the consolidation center. Yard drivers receive the task data and transport trailers to the docks according to the schedule.

The computerized system and method performs a "demand pegging" operation by viewing current inventory levels within the consolidation center and comparing them to production demand data. Production demand data is reflected in an order generation database that provides task data to associates of the logistics provider to load containers of parts on vehicles for delivery to the production line. For each task, the pick time and quantity of parts needed is known. The computerized system and method uses the pick time and quantity data to determine when part shortages are expected to occur and then to ensure that parts are unloaded from trailers or other containers to replenish inventory according to the time and quantity demand. Process time data related to the time required to transport parts between various locations is determined and used in calculating a time when a trailer from the yard or other container from a storage inventory area should be requested. As a result, a continuous supply of parts is made available to the associates that facilitate delivery of parts from the consolidation center to the production line.

DETAILED DESCRIPTION

Figure 1:
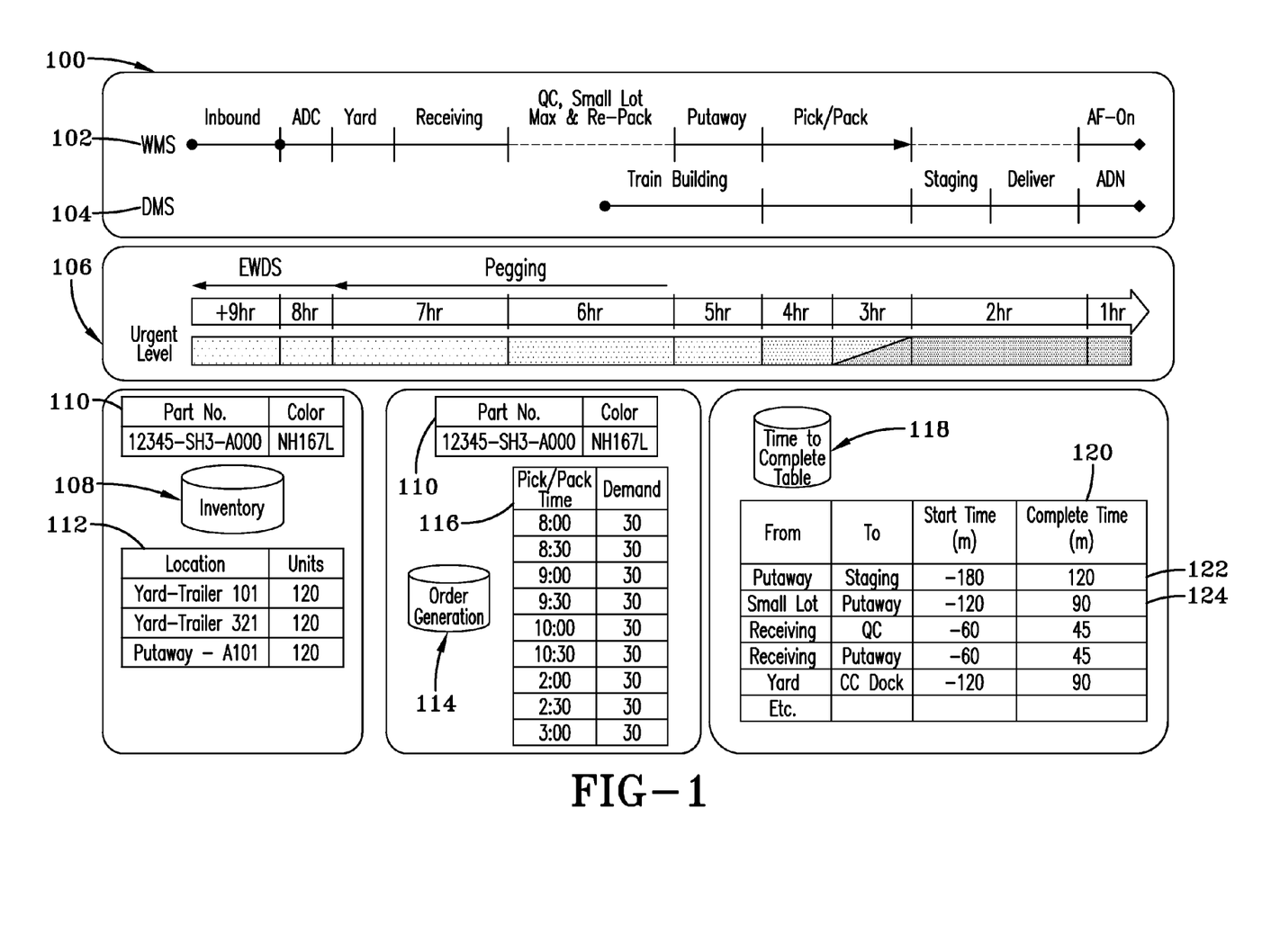
FIG. 1 is a block diagram of a consolidation center inventory and delivery process for an example embodiment.

Referring to FIG. 1, a block diagram of a consolidation center inventory and delivery process for an example embodiment is shown. One or more computer systems 100 may support the inventory and delivery process. A warehouse management system 102 tracks data related to the movement of parts throughout the consolidation center as follows:

TABLE 1

| Warehouse Management System Data | |
|---|---|
| Process | Description |
| Inbound | Parts arrive (in containers) on inbound trailers. WMS 102 has data for each inbound trailer and the parts loaded in the trailer. |
| Arrival and Departure Center | Trailers are processed through an arrival and departure center. |

TABLE 1-continued

| Warehouse Management System Data | |
|---|---|
| Process | Description |
| Yard | Trailers with parts are temporarily stored in the yard. Each trailer is assigned a location in the yard and each trailer's location in the yard is recorded in WMS 102. |
| QC, Small Lot, Demand Repack and Re-pack | Special handling for parts. Certain parts may be inspected or re-packed. |
| Putaway | Containers of parts are stored in delivery inventory areas at the consolidation center to facilitate a pick/pack operation. Each container's location in the consolidation center is recorded in WMS 102. The containers are in an area available to associates completing the pick/pack operations. |
| Pick/Pack | Containers are selected or "picked" from delivery inventory or putaway locations for delivery to the production line. Associates use a computer generated "pick/pack" check sheets that identifies the part containers to load on a cart by or at a specified time. Containers may be loaded on multi-shelf carts that are connected to form a train pulled by a tugger to the production line. |
| AF-On | Parts are delivered line side and then used in assembly operations during the production period. |

A delivery management system 104 tracks data related to the transportation of parts from the consolidation center to the production line as follows:

TABLE 2

| Delivery Management System | |
|---|---|
| Process | Description |
| Train Building | Trains comprising a plurality of cart types are assembled throughout the production period and loaded with parts containers that are delivered line side. Trains are reconfigured throughout the production period and parts are delivered when needed to the appropriate production line locations. The delivery management system 104 receives manufacturer production schedule data as well as part and container data to determine which parts are needed and when they are needed. Lead times for delivering parts to different line side locations are determined and used in configuring carts for each train that transports the parts. |
| Pick/Pack | Containers are selected or "picked" for delivery to the production line. Associates use a "pick/pack" check sheets that identifies the part containers to load on a cart by or at a specified time. Containers may be loaded on multi-shelf carts that are connected to form a train that is pulled by a tugger to the production line. |
| Staging | Organize carts and trains for delivery of parts to production line side locations. |
| Deliver | Tuggers pull multi-cart trains to specified production line locations identified on the parts containers. |
| ADN | Parts are delivered line side throughout the production period. |

Process times for transporting parts from the yard to the consolidation center as well as between points in the consolidation center and to the production line locations are considered in determining task times 106. In an example embodiment of demand pegging, trailers in the yard are "pegged" and transported from the yard to the consolidation center approximately six to seven hours in advance of the time that the parts on the trailer are required line side. The interval between "pegging" and line side delivery provides sufficient time to move trailers and unload them in time to replenish delivery inventory at putaway locations where the parts are selected or "picked" for delivery to production line locations.

Data from several sources is used to determine task times for pulling and unloading trailers. An inventory database 108 comprises location and quantity data 112 for the parts 110 used in production. In the example shown, 120 units of part 12345-SH3-A000: NH167L each are in trailers 101 and 321 in the yard and in putaway location A101 for a total of 360 units in consolidation center inventory. An order generation database 114 comprises pick/pack time and demand data 116 for the parts used in production. The pick/pack time and demand data 116 identifies when the specified quantity of parts should be "picked" from the consolidation center delivery inventory in putaway locations for delivery to the production line. In the example shown, 30 units of the part are picked for delivery every half hour from 8:00 to 10:30 and again from 2:00 to 3:00. Finally, process time data from a process time or "time to complete table" database 118 is used to determine task times for transporting trailers from the yard to docks at the consolidation center. A process time for transporting parts between various locations in the consolidation center is calculated and recorded in the process time database. For each pair of locations, a complete time is determined and based on the complete time, a start time is determined. For example, the complete process time between the "from" locations "putaway" and "to" location "staging" is 120 minutes 122. The assigned start time is 180 minutes before the time the parts are needed at the ending or "to" location. For the "from" location "small lot" to the "to" location "putaway," the complete process time is 90 minutes while the assigned start time is 120 minutes before the time the parts are needed at the "putaway" location 124.

Figure 2A:
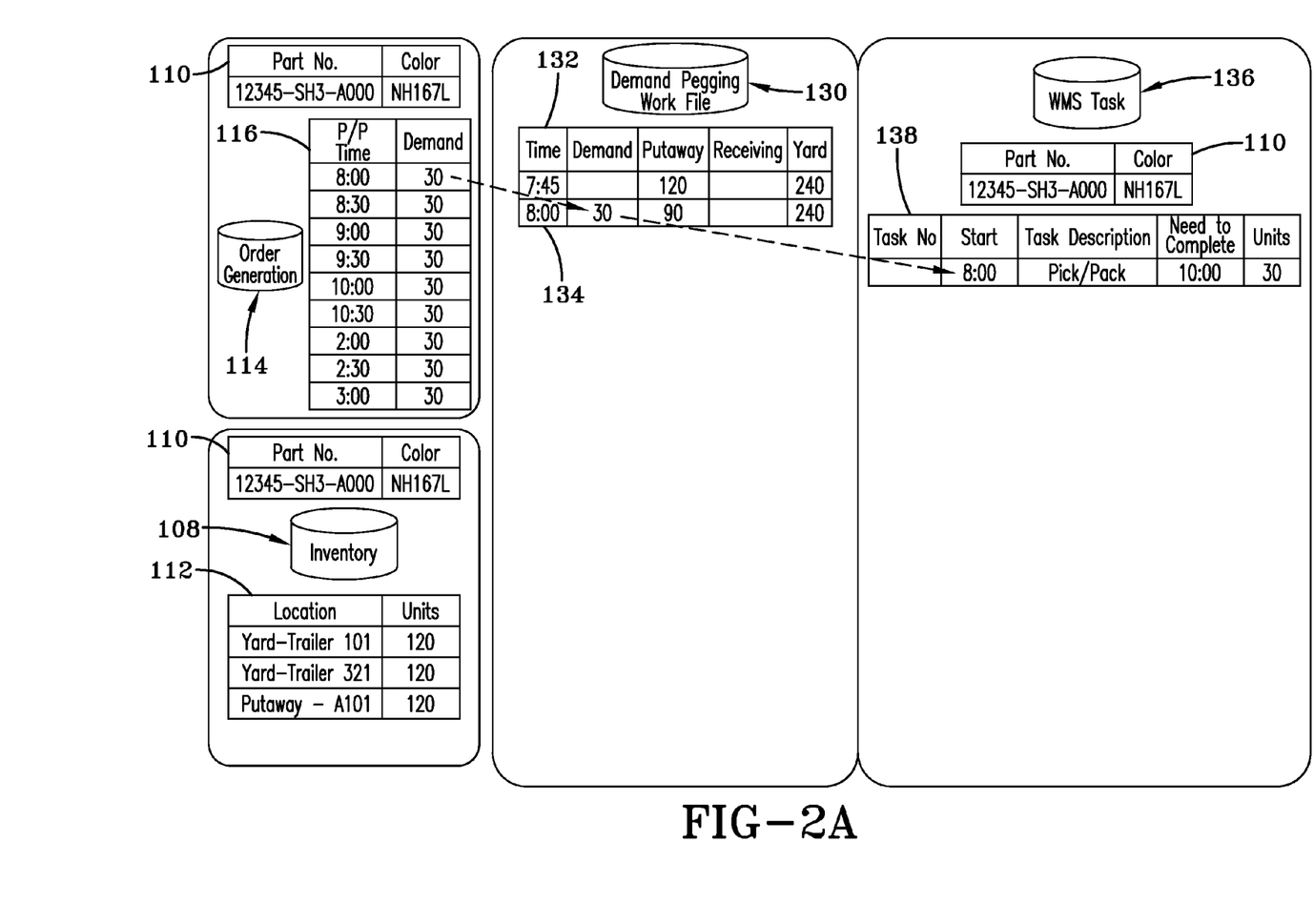
FIGS. 2A-2D are diagrams illustrating a demand pegging calculation for an example embodiment.

Referring to FIGS. 2A-2D, diagrams illustrating a demand pegging calculation for an example embodiment are shown. Referring to FIG. 2A, in the first phase of the demand pegging calculation, the changes in inventory levels that occur as each order generation task is completed are calculated. The calculations are used to generate work tasks against the specific demand. The order generation database 114 comprises pick/pack time data and demand data 116 for a specified part 110 (e.g., part no. 12345-SH3-A0000 NH167L). The inventory database 108 indicates that for the specified part 110, 120 units are in "putaway" location A101, 120 units are in yard—trailer 321, and 120 units are in yard—trailer 101 112.

The demand pegging calculations are performed using a demand pegging work file 130. A demand pegging table 132 comprising time and demand data from the order generation database 114 as well as putaway, receiving, and yard inventory data from the inventory database 108 is maintained in the demand pegging work file database 130. The time and demand data 134 is obtained from the order generation database 114 and the putaway and yard inventory data 134 is obtained from the inventory database 108. As pick/pack and demand data is added to the demand pegging table 132 for each order generation task, the resulting changes in inventory are tracked. Initially, delivery inventory from the putaway location is tracked. For example, when the 8:00 pick/pack task for 30 units of the part is completed, the starting delivery (putaway) inventory of 120 units is reduced to 90 units 134. Based on the inventory tracking calculations 132, the system "pegs" the time needed for the unloading trailers and generates a task list 138 that is stored in a WMS task database 136.

A WMS task database 136 comprises the task list 138 related to the part 110 and the movement or flow of various quantities of the part throughout the consolidation center. The task list 138 comprises a description of the task and the time it should be completed as well as the pick/pack time (8:00 AM) and demand data (30 units) obtained from the order generation database 114. The demand for parts as indicated in the order generation database is used to populate the task list with specific tasks related to the part.

Figure 2B:
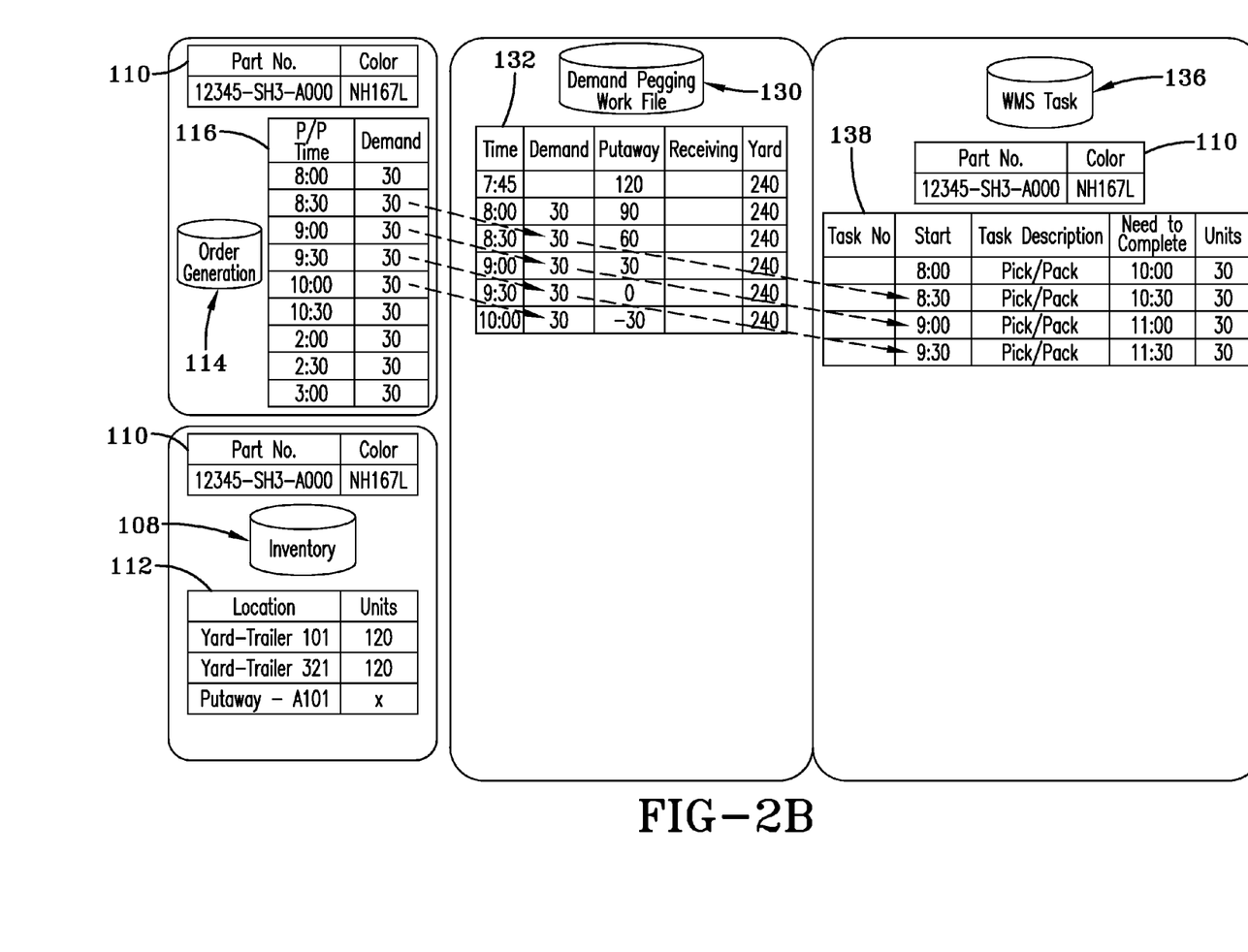

Referring to FIG. 2B, additional entries from the order generation database 114 are copied to the demand pegging table 132 in the demand pegging work file 130 and to the task list 138 in the WMS task database 136. As each entry from the order generation table 116 is added to the demand pegging table 132, the units that will be consumed as the processes are completed are deducted from the inventory data (delivery/putaway, receiving, and yard) in the table. Initially, the units are deducted from the delivery inventory in a putaway location. In the example shown, the delivery (putaway) inventory is 120 units at 7:45, 90 units at 8:00, 60 units at 8:30, 30 units at 9:00, 0 units at 9:30 and −30 units at 10:00. As a result of the calculations, a deplete time of 10:00 is determined. Although the deplete time for the example calculation is associated with the time at which the inventory level is negative, one of skill in the art would recognize that the deplete time may be any time at which it is determined the inventory level is insufficient to meet the production demand. Similar calculations may be performed based on when the number of units is at zero rather than below zero.

Figure 2C:
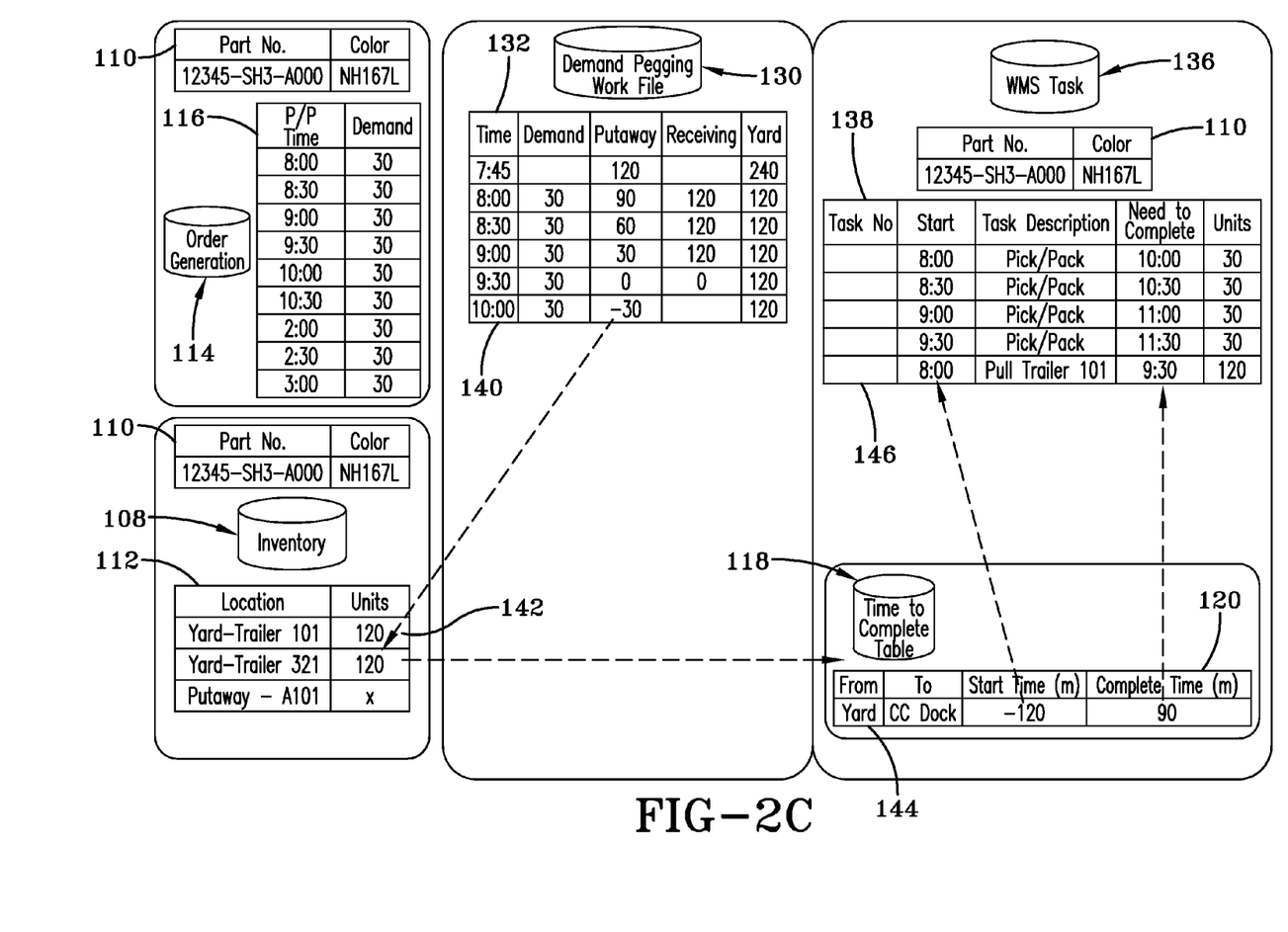

When the delivery inventory level in putaway location becomes negative or is depleted, a trailer in the yard with the specified part is "pegged" for unloading. Referring to FIG. 2C, additional details regarding the pegging process are shown. Calculations from the demand pegging table indicate that delivery inventory in the putaway location will drop below zero units for the 10:00 pick/pack task 140 if the inventory is not replenished. When the inventory for the part 110 drops below zero, the demand pegging operation checks the available inventory in the trailers to identify a trailer for unloading. In the example, yard trailer 101 has 120 units 142 of the part 110 that is needed. An entry in the process or "time to complete" database 118 indicates that the process of transporting a trailer from the yard to a consolidation center dock and unloading it requires 90 minutes to complete 144. The start time is 120 minutes before the time at which the need is identified (10:00) 144. The time to complete the task is 90 minutes 144. A task of pulling trailer 101 at 8:00 (120 minutes before the parts are needed at 10:00) and unloading it by 9:30 (90 minutes after the start time) is generated and added to the task list 146. Finally, the number of parts (120) associated with the task is added to the task list 138.

Figure 2D:
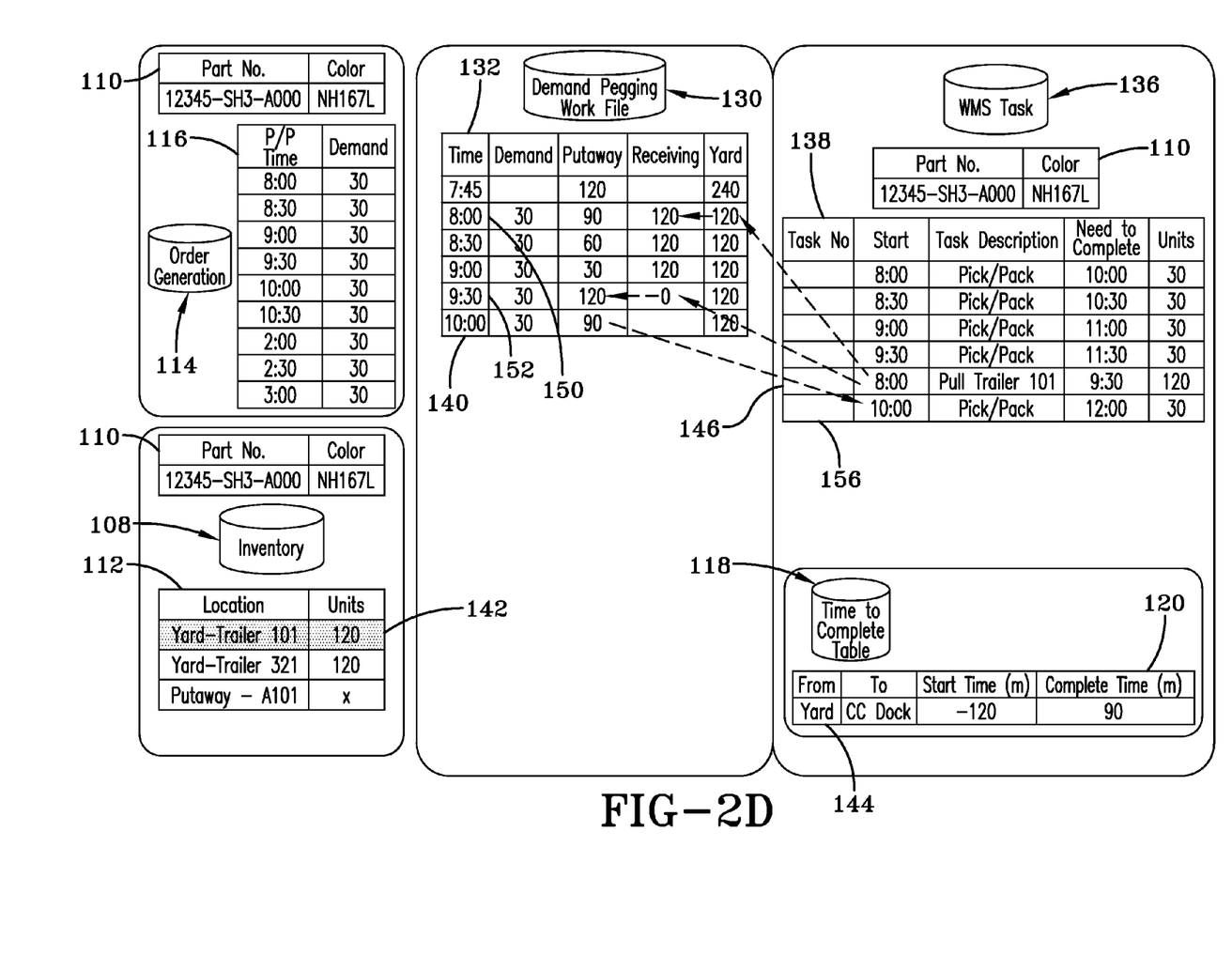

Referring to FIG. 2D, the process of updating the demand pegging table 132 and task list 128 is illustrated. The 8:00 pull trailer entry 146 from the task list 138 is used to update entries in the demand pegging table 154 so that additional demand-based tasks can be generated. The 8:00 "pull trailer 101" task 146 which involves 120 units results in a corresponding decrease of 120 units in the yard inventory and an increase of 120 units in the receiving inventory for the 8:00 entry 150. At 9:30 when the unloading task is complete (e.g., parts transported from dock to putaway location), the receiving inventory is decreased by 120 units and the delivery inventory in the putaway location is increased by 120 units 152. The parts from trailer 101 are then available for the 10:00 pick/pack task 140 and the 10:00 pick/pack task is added to the task list 156.

Figure 3A:
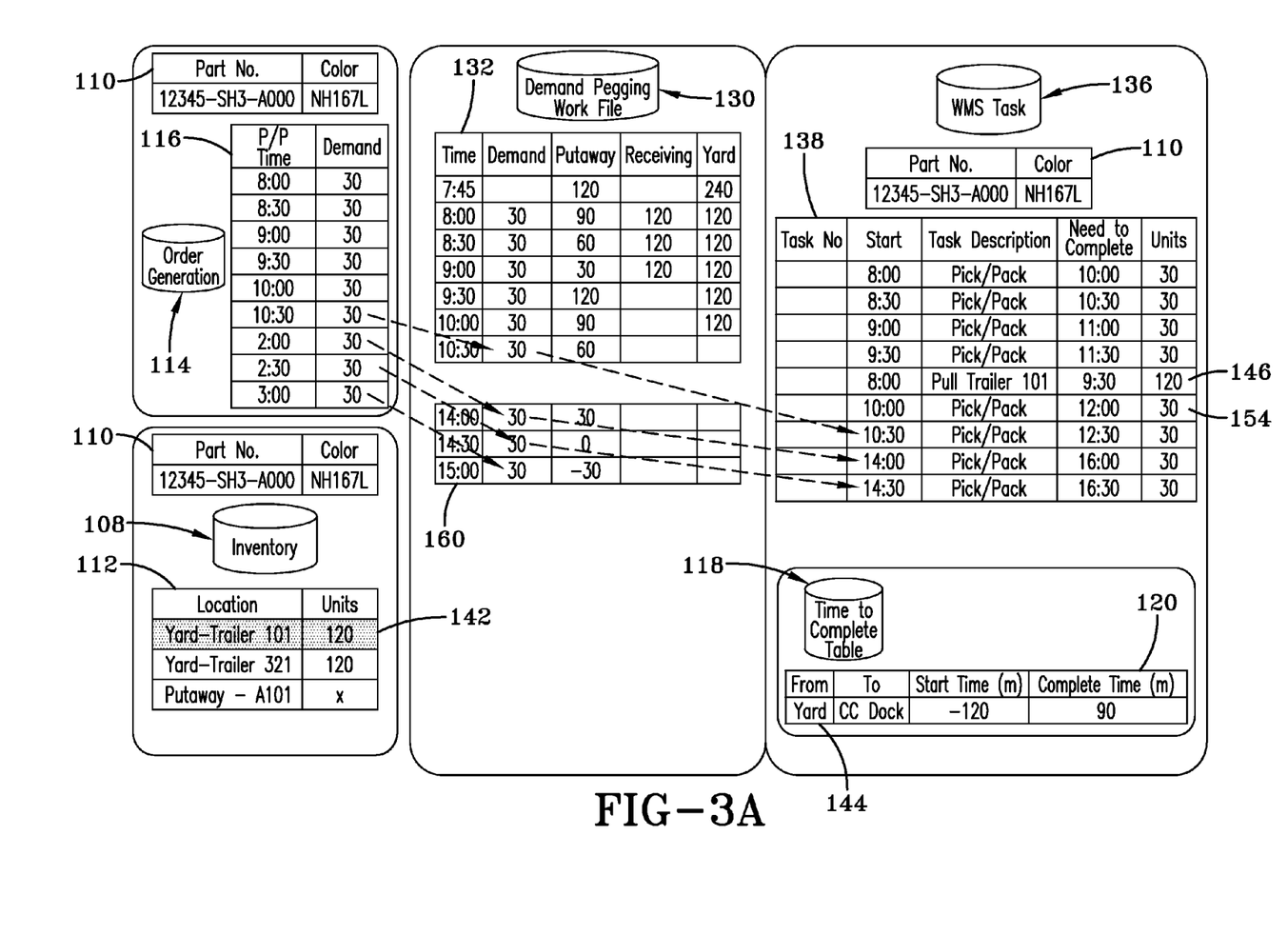
FIGS. 3A-3C are diagrams illustrating a second demand pegging operation for an example embodiment.
Figure 3B:
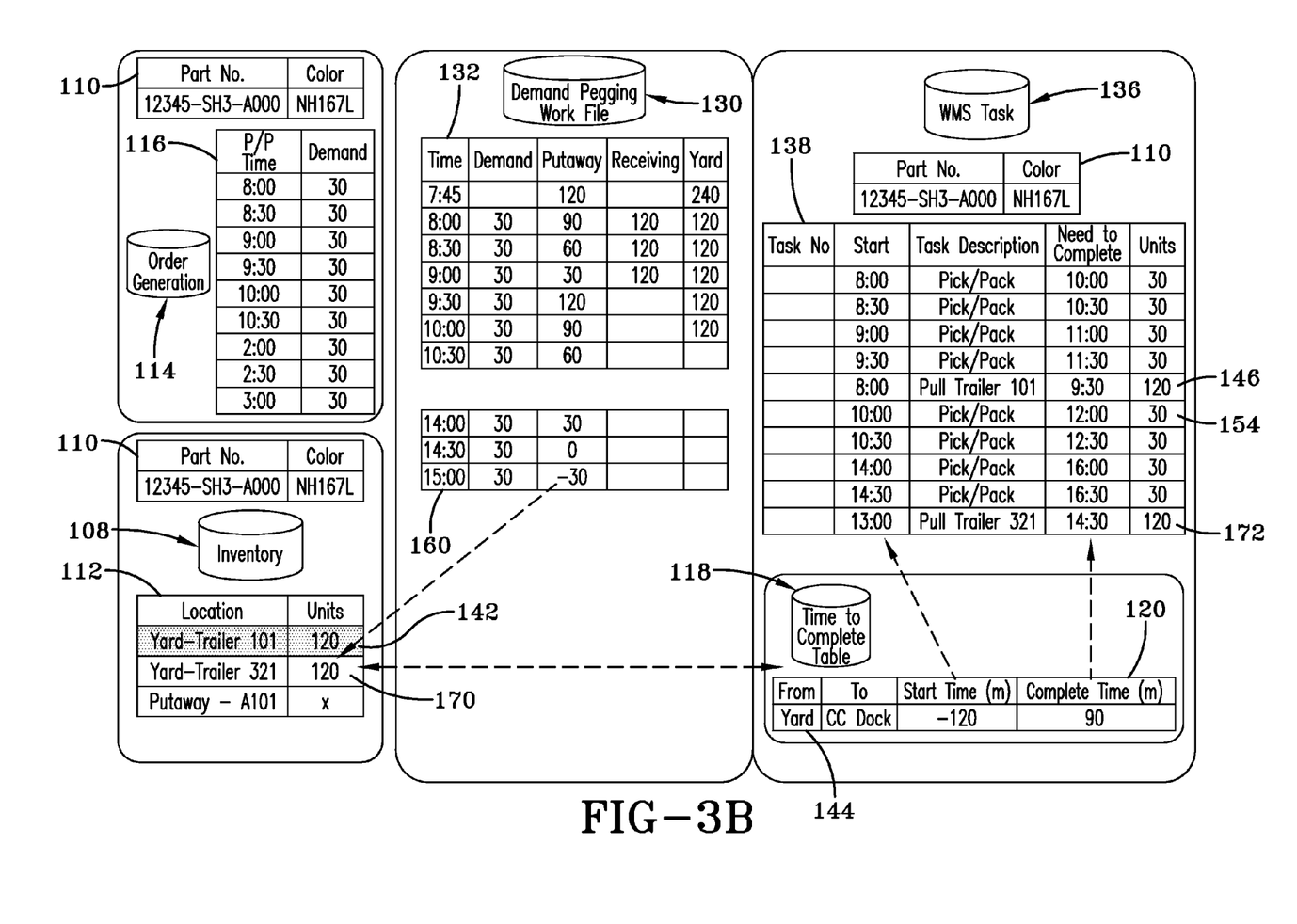
Figure 3C:
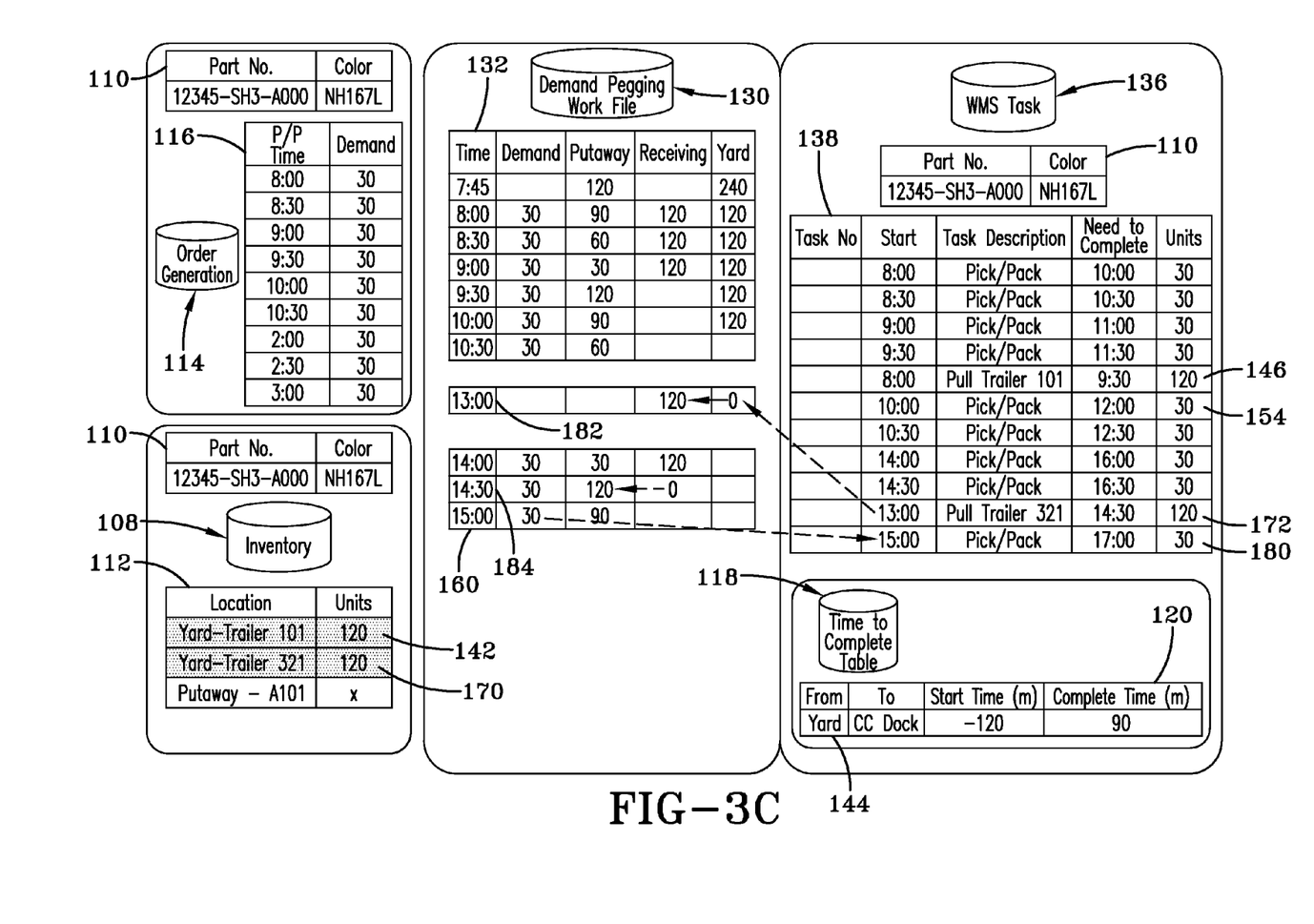

Referring to FIGS. 3A-3C, diagrams illustrating a second demand pegging operation for an example embodiment are shown. Referring to FIG. 3A, a 10:30 pick/pack entry originating from the order generation database 114 is added to the demand pegging work table 160 and to the task list 164. Additional entries for 2:00 and 2:30 are also added to the demand pegging work table 160 and to the task list 164. For each entry in the demand pegging work table 160, the delivery inventory level in the putaway location is assigned to the pick/pack task until the inventory becomes negative. At 15:00, the delivery inventory level in the putaway location once again drops below zero 160.

Referring to FIG. 3B, the negative entry in the demand pegging work table 160 results in the demand pegging operation of locating a trailer with the needed parts. The inventory database 108 indicates that yard—trailer 321 has 120 units of the specified part 12345-SH3-A000 110. The process time database 118 indicates that the process of transporting a trailer from the yard to a consolidation center dock and unloading it requires 90 minutes to complete 144. The start time is 120 minutes before the time at which the need is identified (10:00) 144. The time to complete the task is 90 minutes 144. A task of pulling trailer 321 at 13:00 (120 minutes before the parts are needed at 15:00) and unloading it by 14:30 (90 minutes after the start time) is generated and added to the task list 172. Finally, the number of parts 120 associated with the task is added to the entry 172 in task list 138.

Referring to FIG. 3C, the process of updating the demand pegging table 132 and task list 128 is illustrated. The 13:00 pull trailer entry 172 from the task list 138 is used to update entries in the demand pegging table 132 so that additional demand-based tasks can be generated. The 13:00 "pull trailer 321" task 172 which involves 120 units results in a corresponding decrease of 120 units in the yard inventory and an increase of 120 units in the receiving inventory for the 13:00 entry 182. At 14:30 when the unloading task is complete, the receiving inventory is decreased by 120 units and the delivery inventory in the putaway location is increased by 120 units 184. The parts from trailer 321 are then available for the 15:00 pick/pack task 160. The 15:00 pick/pack task is then added to a new entry 180 in the task list 138.

Figure 4:
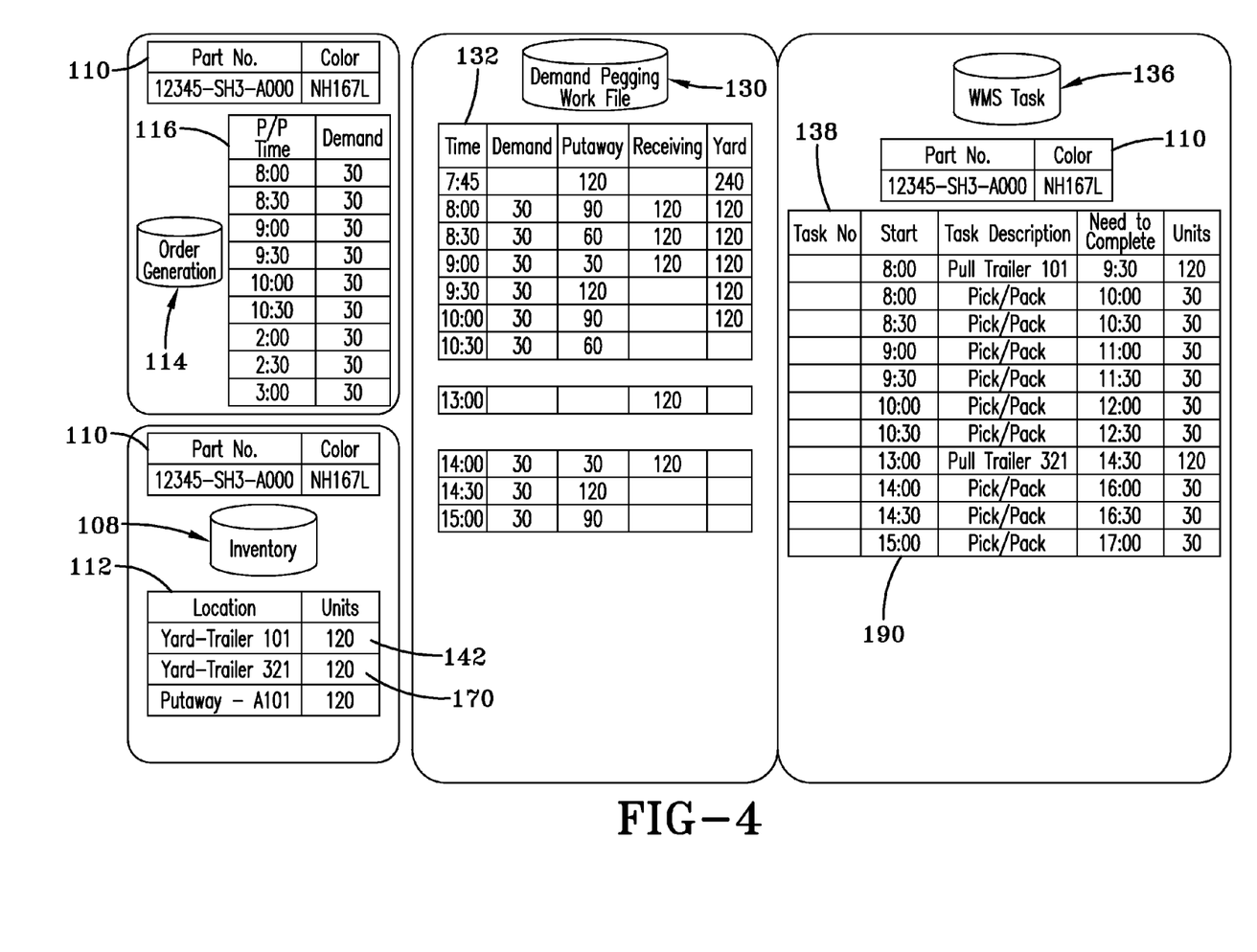
FIG. 4 illustrates additional steps in a demand pegging operation for an example embodiment.

Referring to the FIG. 4, additional steps in the demand pegging operation include sorting the task list based on start time 190 after all items in the order generation table 116 have been processed. In the example, the demand pegging operation resulted in two "pull trailer" tasks that were generated and added to the task list. Trailer 101 is called at 8:00 while trailer 321 is called at 13:00. The trailers are unloaded and the delivery inventory in putaway locations is replenished at the appropriate times so that the pick/pack operations can continue.

Figure 5:
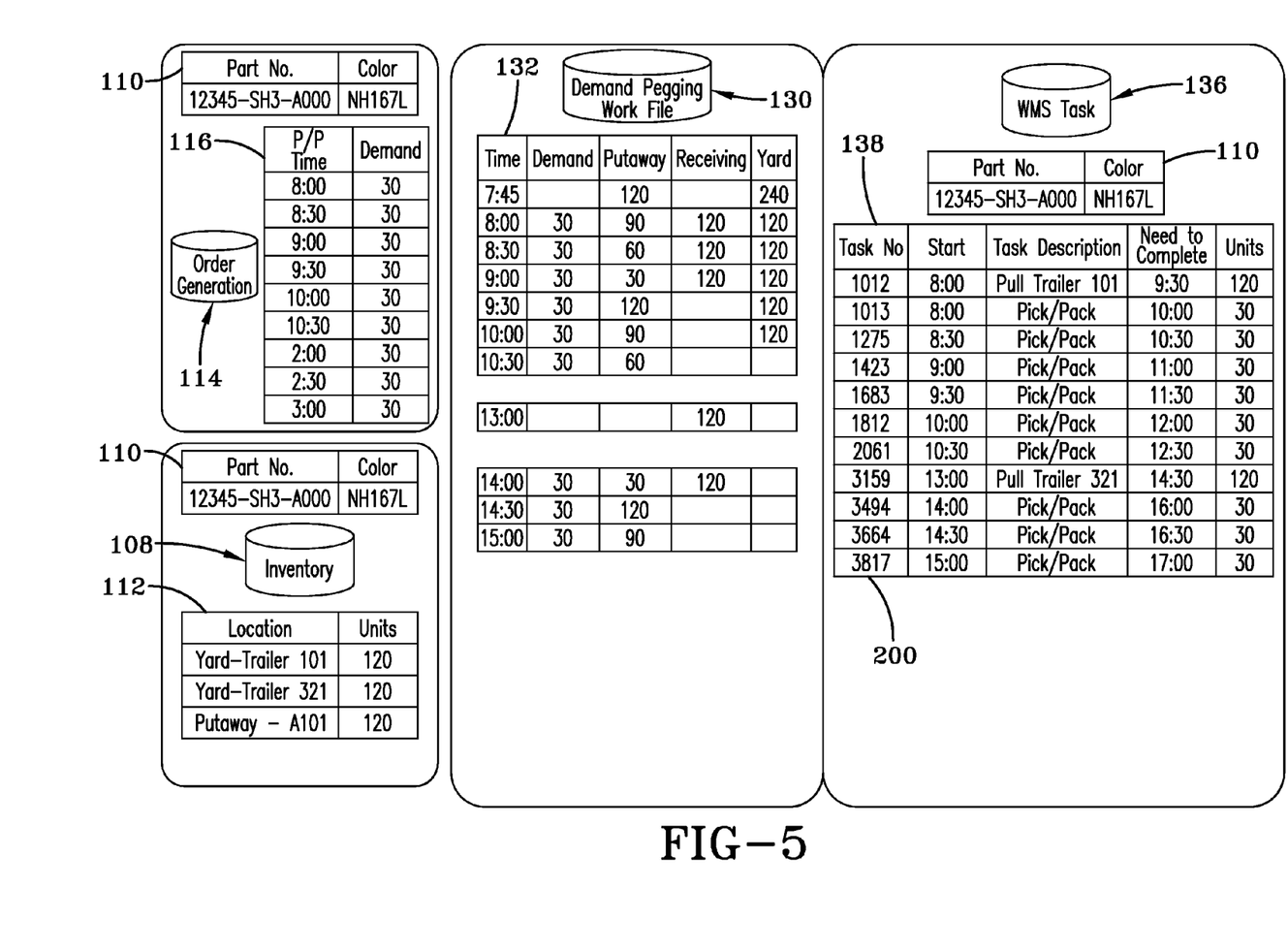
FIG. 5 illustrates the final step in the demand pegging operation for an example embodiment.

Referring to FIG. 5, the final step in the demand pegging operation is to add task numbers 200 to entries in the task list 138. The task numbers allow individual tasks to be tracked for various reasons. Trailer pull tasks for a plurality of parts may be added to a receiving schedule that is provided to associates responsible for transporting trailers from the yard to docks at the consolidation center. The receiving schedule provides associates with information regarding the order in which trailers are requested and therefore, unloaded at the consolidation center. An example receiving schedule is shown in Table 3:

TABLE 3

Sample Receiving Schedule

| L/D | Trailer | Date | Time | SCAC | Trailer | Dock | Door |
|---|---|---|---|---|---|---|---|
| D | Inb-Door | Jun. 24, 2009 | 09:47 | CHBL | 9722 | C1 | 018 |
| D | Inb-Door | Jun. 24, 2009 | 11:34 | ONEW | 3256 | C1 | 018 |
| D | Inb-OnYar | Jun. 24, 2009 | 11:57 | BSYS | 50022 | | |
| D | Inb-Door | Jun. 24, 2009 | 12:44 | CUOT | 9854 | C1 | 026 |
| D | Inb-OnYar | Jun. 24, 2009 | 14:18 | CHBL | 2323 | | |
| D | Inb-OnYar | Jun. 25, 2009 | 08:22 | AVRT | 1270 | | |
| D | Inb-OnYar | Jun. 25, 2009 | 08:22 | BLQO | 5253 | | |

TABLE 3-continued

Sample Receiving Schedule

| L/D | Trailer | Date | Time | SCAC | Trailer | Dock | Door |
|---|---|---|---|---|---|---|---|
| D | Inb-OnYar | Jun. 25, 2009 | 08:49 | CH BL | 2323 | | |
| D | Inb-OnYar | Jun. 25, 2009 | 09:25 | CKTF | 1010 | | |
| D | Inb-OnYar | Jun. 25, 2009 | 12:11 | CUOT | 3003 | | |
| D | Inb-OnYar | Jun. 25, 2009 | 13:13 | BSYS | 5006 | | |

Although a trailer may be pegged because of a particular part that is loaded on the trailer, the trailer may additionally have parts that are not subject to the demand pegging request. The entire trailer may be unloaded and parts that were not subject to the demand pegging request may be added to the consolidation center inventory and used to fulfill production demand. Any type of container for storing parts may be subject to a demand pegging operation and containers may be stored in various types of storage inventory areas (e.g., trailers in a yard). Each container may comprise different types of parts in addition to the type of part that is subject to a demand pegging request.

The demand pegging function is applied to all parts in the order generation database 114 so that parts flow to the delivery inventory in putaway locations as needed to meet the manufacturer's production demand. Using the demand pegging function, inventory for production may be held in trailers in the yard and called on demand. The demand pegging operation allows the logistics provider to prioritize the unloading of trailers. Although trailers may arrive at the yard in any order, the demand pegging operation defines an order for unloading them by considering production demands. Trailers are "pegged" according to the parts they contain so that a flow of parts to production is maintained.

Although the demand pegging operation is described in relation to a consolidation center inventory that is maintained in a trailer yard, the operation may be applied to inventory maintained in other areas of the consolidation center. For example, inventory maintained in an overstock area or areas maintained off site may be pegged. The computerized system and method may be configured in a variety of ways to meet the needs of the logistics provider including the manner in which inventory areas are defined and managed. Some locations may be managed as delivery inventory areas in which parts are held for the pick/pack operation while other areas are primarily short-term storage areas (e.g., yard, overstock).

An exemplary embodiment of a computerized parts delivery management system has been shown and described above. It should be realized by one skilled in the art that various modifications may be made to the computerized system and method described above as well as data items and databases used in the analysis. Changes to the production phases and delivery techniques as well inventory locations may be made and fall within the scope of the claimed invention. Therefore, while certain embodiments of the present invention are described in detail above, the scope of the invention is not to be considered limited by such disclosure, and modifications are possible without departing from the spirit of the invention as evidenced by the following claims:

What is claimed is:

1. A computerized method for automated demand-based delivery of parts to an inventory area in a warehouse comprising:

(a) entering in a computer part identifying data for a part used in production;

(b) entering in said computer process time data comprising an amount of time to transport said parts from a storage inventory area at said warehouse to a delivery inventory area at said warehouse;

(c) entering in said computer inventory data for inventory of said part, said inventory data comprising:
  (1) a number of units of said part in said delivery inventory area;
  (2) a number of units of said part in said storage inventory area;

(d) entering in said computer order data for said part comprising a plurality of pick times and for each pick time, a number of units;

(e) calculating at said computer a delivery inventory deplete time by subtracting for each of said plurality of pick times:
  said number of units for said pick time from said number of units in said delivery inventory area;

(f) calculating at said computer for said pick time associated with said delivery inventory deplete time a task time for transporting said parts from said storage inventory area to said delivery inventory area by subtracting said process time from said pick time;

(g) creating at said computer a task entry comprising said part identifying data, said task time, and said storage inventory area; and (h) communicating to an associate said task entry for transporting said parts from said storage inventory area according to said task time.

2. The method of claim 1 wherein said storage inventory area is a trailer in a yard at said warehouse.

3. The method of claim 1 wherein said storage inventory area is an overstock inventory area in said warehouse.

4. The method of claim 1 further comprising starting at said task time an operation of transporting said parts from said storage inventory area to said delivery inventory area.

5. The method of claim 1 further comprising adding said task entry to a receiving schedule identifying an order for transporting said parts from said storage inventory area to said delivery inventory area.

6. The method of claim 1 further comprising generating a pick sheet with an entry to pick said part from said delivery inventory area at said pick time.

7. The method of claim 1 wherein said delivery inventory deplete time is a time when said number of units in said delivery inventory area is negative.

8. The method of claim 1 wherein said delivery inventory deplete time is a time when said number of units in said delivery inventory area is zero.

9. A computerized system for demand-based delivery of parts to an inventory area in a warehouse comprising:
  (a) at least one database for storing:
    (1) part identifying data for a part used in production;
    (2) process time data comprising an amount of time to transport said parts from a storage inventory area at said warehouse to a delivery inventory area at said warehouse;
    (3) inventory data for inventory of said part, said inventory data comprising:
      (i) a number of units of said part in said delivery inventory area;
      (ii) a number of units of said part in said storage inventory area;
    (4) order data for said part comprising a plurality of pick times and for each pick time, a number of units;
  (b) a computer that accesses said at least one database and executes a process to:
    (1) calculate at said computer a delivery inventory deplete time by subtracting for each of said plurality of pick times:
      said number of units for said pick time from said number of units in said delivery inventory area;
    (2) calculate at said computer for said pick time associated with said delivery inventory deplete time a task time for transporting said parts from said storage inventory area to said delivery inventory area by subtracting said process time from said pick time;
    (3) enter in said at least one database at said computer a task entry comprising said part identifying data, said task time, and said storage inventory area; and
    (4) communicate to an associate said task entry for transporting said parts from said storage inventory area according to said task time.

10. The system of claim 9 wherein said storage inventory area is a trailer in a yard at said warehouse.

11. The system of claim 9 wherein said storage inventory area is an overstock inventory area in said warehouse.

12. The system of claim 9 wherein said associate initiates at said task time an operation to transport said parts from said storage inventory area to said delivery inventory area.

13. The system of claim 9 further comprising a receiving schedule generated by said computer that comprises an order for transporting parts from said storage inventory area to said delivery inventory area.

14. The system of claim 9 further comprising a pick sheet with an entry for picking said part from said delivery inventory area at said pick time.

15. The system of claim 9 wherein said delivery inventory deplete time is a time when said number of units in said delivery inventory area is negative.

16. The system of claim 9 wherein said delivery inventory deplete time is a time when said number of units in said delivery inventory area is zero.

17. A computerized method for demand-based delivery of parts from a trailer storage inventory area at a warehouse comprising:
  (a) entering in a computer part identifying data for a part used in production;
  (b) entering in said computer process time data comprising an amount of time to transport said parts from said trailer storage inventory area to a delivery inventory area;
  (c) entering in said computer inventory data for inventory of said part, said inventory data comprising:
    (1) a number of units of said part in said delivery inventory area;
    (2) a number of units of said part in said trailer storage inventory area;
  (d) entering in said computer order data for said part comprising a plurality of pick times and for each pick time, a number of units;
  (e) calculating at said computer a delivery inventory deplete time by subtracting for each of said plurality of pick times:
    said number of units for said sick time from said number of units in said delivery inventory area;
  (f) calculating at said computer for said pick time associated with said delivery inventory deplete time a task time for transporting said parts from said trailer storage inventory area to said delivery inventory area by subtracting said process time from said pick time;
  (g) creating at said computer a task entry comprising said part identifying data, said task time, and said trailer storage inventory area;

(h) communicating to an associate said task entry for transporting said parts from said trailer storage inventory area according to said task time; and (i) updating said computer inventory data with a number of units of said part in said delivery inventory area after said parts are transported from said trailer storage inventory area to said delivery inventory area.

18. The method of claim 17 further comprising communicating to at least one associate a task entry for unloading all parts from a trailer transported from said trailer storage inventory area according to said task time.

19. The method of claim 18 further comprising updating said computer inventory data with a number of units for at least one other part from said trailer.

20. The method of claim 17 wherein said delivery inventory deplete time is selected from the group consisting of a time when said number of units in said delivery inventory area is zero and a time when said number of units in said delivery inventory area is below zero.

* * * * *